Dec. 22, 1936.  H. K. REINOEHL ET AL  2,065,094
SPRING SUSPENSION
Filed Nov. 14, 1935
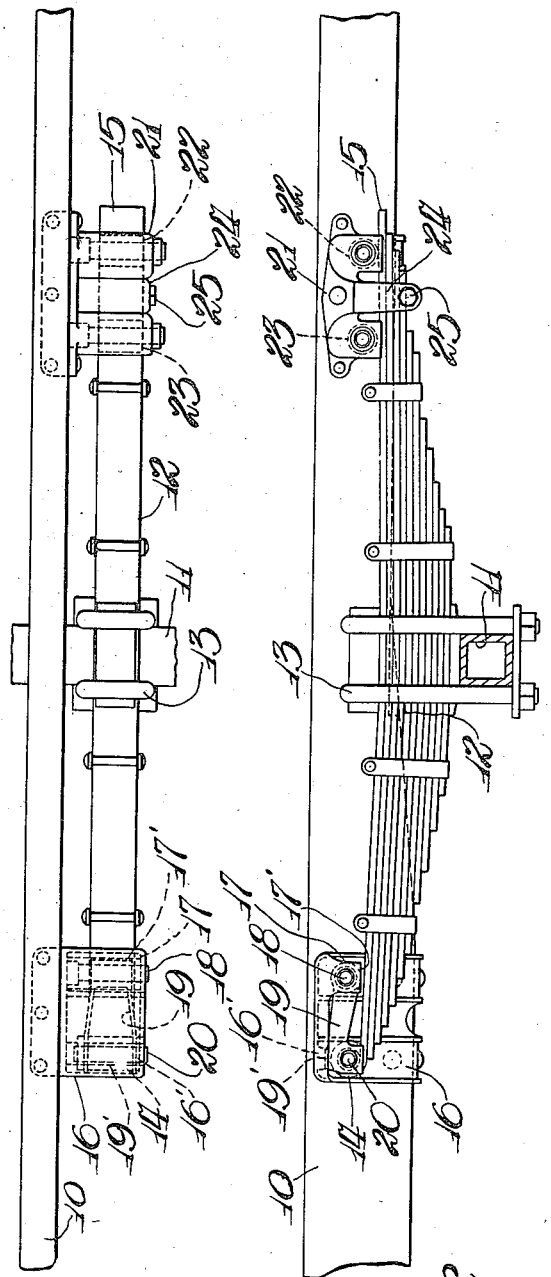
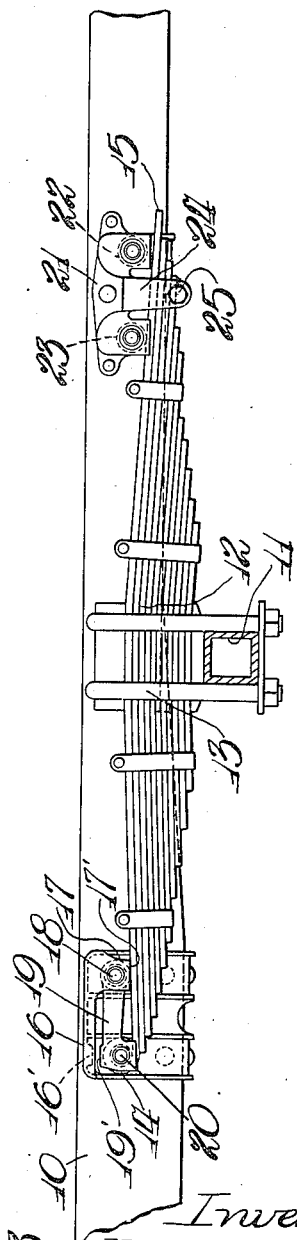
Inventors
Harry K. Reinoehl
and
Joseph Kuttler
By V. J. Lassagne
Atty Patented Dec. 22, 1936

2,065,094

UNITED STATES PATENT OFFICE 2,065,094

SPRING SUSPENSION

Harry K. Reinoehl and Joseph Kuttler, Fort Wayne, Ind., assignors to International Harvester Company, a corporation of New Jersey Application November 14, 1935, Serial No. 49,778

4 Claims. (Cl. 267—54)

This invention relates to a spring suspension for vehicles, and more particularly to a spring suspension which may compensate for overload and excessive deflection.

An object of the invention is to provide a spring suspension comprising a spring supported at either end by means on the vehicle frame for varying the effective length of the spring.

Another object is to provide means on the vehicle frame for supporting one end of the spring in varied positions and means on the vehicle frame for supporting the other end of the spring and permitting longitudinal movement of the spring while the effective spring length is being shortened to compensate for excessive deflection.

Other objects and advantages will appear in the following specification, claims, and drawing. In the drawing:

Figure 1 is a plan view of a vehicle frame, axle, and spring embodying the invention;

Figure 2 is a side elevation of the same, showing the spring normally flexed; and, Figure 3 is a similar view showing the spring in a position of excessive deflection.

In the drawing a vehicle frame of the usual type is indicated at 10, only one side or frame member being shown. A portion of an axle is shown at 11 extending transversely across and below the vehicle frame 10. A compound leaf-spring 12 is secured intermediate its ends to the axle 11 by the usual securing means 13. The spring 12 is formed at one end with the customary rolled portion 14 and at the other end with a substantially straight end portion 15 for purposes later to appear.

Secured to the vehicle frame 10, in spaced relation to the axle 11, is a member in the form of a supporting casting 16. This member 16 extends outwardly from the vehicle frame 10 a sufficient distance to overlap the width of the spring 12 and is formed at one end and outside the spring 12 with a downward extension 17. A pin through this downward extension 17 and the inner edge of the member 16 adjacent the vehicle frame 10 provides a pivot 18 for one end of a link 19. The other end of the link 19 is pivotally connected to the spring 12 at its roller portion 14 by the pivot pin 20. The link 19 is forked at the point of connection to the spring 12, and is formed with a cross-abutment 19' substantially above the pivot pin 20. It will now be apparent that the one end 14 of the spring 12 is pivotally carried by the link 19, and the link 19 is in turn pivotally carried by the member 16 on the vehicle frame 10.

Extending across the member 16 directly below the pivot 18 and integral with the downward extension 17 and the inner edge of the member 16 is an abutment 17'. In spaced relation to the abutment 17', and, adapted to coact with the abutment 19' on the link 19 is a second abutment 16' on the member 16, the purpose of which will appear later.

Secured to the vehicle frame 10 and adapted to support the other end 15 of the spring 12 are means in the form of a casting 21, said means comprising two spaced rollers 22 and 23. A downward extension 24, formed integral with the casting 21 and outside the spring 12, provides means for confining the end 15 of the spring 12 to the rollers 22 and 23. A bolt 25 through the extension 24 and the inner edge of the casting 21 adjacent the vehicle frame 10 further aids in confining the end 15 of the spring 12 to the rollers.

As best shown in Figure 2, while the spring 12 is normally flexed, the link 19, pivotally connected at 20 to the roller portion 14 of the spring 12, is in its uppermost position with the abutment 19' abutting the abutment 16' on the member 16. At the other end of the spring suspension, the straight portion 15 of the spring 12 is abutting the roller 22, which roller is of a greater distance from the axle 11 than the roller 23. It will be apparent from an examination of Figure 2 that the points of suspension are at their extreme farthest distances apart, thus affording the spring a greater effective length capable of insuring the spring utmost efficiency and safety during normal deflections.

Figure 3 shows the spring when it has been deflected past normal oscillation. An upward thrust of the axle 11 or excessive downward pressure on the vehicle frame 10 causes an excessive deflection of the spring. However, as the spring moves upwardly past a normal oscillation, the end 15, pivotally connected by the pin 20 to the link 19, pulls the link downwardly about the pivot 18, thus separating the point of contact between the abutments 19' and 16', and a still greater upward deflection of the spring 12 causes the spring to abut the abutment 17', as shown, thus shortening that end of the spring substantially the distance between the pivots 18 and 20, or the distance between the spaced abutments 16' and 17'.

At the opposite end of the spring 12 the straight portion 15 leaves the roller 22 and abuts, nearer the axle 11, the roller 23 thus shortening that end of the spring substantially the distance between the rollers.

It will be apparent from the above that the effective length of the spring 12 is now shorter than before or during normal deflection. The length of the spring has been decreased by bringing closer together the points of suspension. In short, the points of suspension have moved toward the axle 11 at one end of the spring 12, from 16' to 17', and have moved toward the axle 11 at the other end of the spring from 22 to 23.

By thus moving the points of suspension closer together, shortening the effective spring length by the distance between the points 18 and 20 plus the distance between the rollers 22 and 23, the spring is strengthened materially against shock and breakage.

It is to be understood that, when the cause for excessive spring deflection is removed, the spring 12 and its suspension points will return to the positions shown in Figure 2.

Only a preferred form of the invention has been described and numerous embodiments of the same may be employed without departing from the scope of the following claims.

What is claimed is:

1. In a spring mounting for vehicles, the combination with a vehicle frame and an axle, of a leaf spring mounted on the axle, means for supporting the frame on one end of the spring including a link pivotally connected to the frame on a transverse axis above the spring and between the ends thereat, said link extending from its pivot on the frame towards the end of the spring and thereabove being pivotally connected with the spring at its end, stop means provided on the link above the frame adjacent its pivotal connection with the spring whereby the frame is supported at the end of the spring during normal flexing of the spring, a second stop means below the link adjacent its pivotal connection of the link with the frame positioned to engage the spring at a point spaced from the end thereof during extreme flexing of the spring whereby the load carrying capacity of the spring is increased, and means for supporting the frame on the other end of the spring.

2. In a spring mounting for vehicles, the combination with a vehicle frame and axle of a spring mounted on the axle, a member secured to the vehicle frame, an abutment on the member, a link pivoted at one end to the member and extending in the direction of the spring extension and pivotally connected to one end of the spring and thereabove between the spring and the abutment, an abutment on the link substantially above the point of connection between the link and spring, an abutment below and adjacent the pivotal connection of the link with the frame whereby the abutment on the link may abut the abutment on the member while the spring is normally flexed and whereby the spring may abut the abutment adjacent the pivotal connection of the link with the frame while the spring is deflected past normal oscillation for shortening the effective length of the spring, and means secured to the vehicle frame for supporting the other end of the spring and permitting longitudinal movement thereof.

3. In a spring mounting for vehicles, the combination with a vehicle frame and axle of a spring mounted on the axle, a member secured to the vehicle frame, said member comprising an abutment and a pivot longitudinally spaced apart, a link extending in the direction of the spring extension and pivotally connected at one end to the pivot on the member and at the other end to one end of the spring thereabove and between the spring and the abutment, an abutment on the link adapted to abut the abutment on the member while the spring is normally flexed, an abutment below and adjacent the pivot whereby the spring may abut said abutment adjacent the pivot while the spring is deflected past a normal oscillation for shortening the effective length of the spring, and means secured to the vehicle frame for supporting the other end of the spring and permitting longitudinal movement thereof.

4. In a spring mounting for vehicles, the combination with a vehicle frame and axle of a spring secured intermediate its ends to the axle, a member secured to the vehicle frame, a pivot on said member, an abutment on the member longitudinally spaced from the pivot in the direction of the spring extension, a link pivotally connected at one end to the pivot, said link extending in the direction of the spring extension and being connected at its other end to one end of the spring thereabove and between the spring and the abutment, a second abutment below and adjacent the pivot whereby the link may abut said first abutment while the spring is normally flexed and whereby the spring may abut the second abutment while the spring is deflected past normal oscillation for shortening the effective length of the spring, and means secured to the vehicle frame for supporting the other end of the spring and permitting longitudinal movement thereof.

HARRY K. REINOEHL.
JOSEPH KUTTLER.